United States Patent
Adler et al.

(10) Patent No.: US 11,693,600 B1
(45) Date of Patent: Jul. 4, 2023

(54) LATENCY-BASED DETECTION OF STORAGE VOLUME TYPE

(71) Applicant: Dell Products L.P., Round Rock, TX (US)

(72) Inventors: Oshri Adler, Tirat Carmel (IL); Tal Abir, Nesher (IL)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/682,003

(22) Filed: Feb. 28, 2022

(51) Int. Cl.
*G06F 3/06* (2006.01)

(52) U.S. Cl.
CPC ............ *G06F 3/0659* (2013.01); *G06F 3/061* (2013.01); *G06F 3/067* (2013.01); *G06F 3/0665* (2013.01)

(58) Field of Classification Search
None
See application file for complete search history.

(56) References Cited

U.S. PATENT DOCUMENTS

| | | | |
|---|---|---|---|
| 10,593,380 B1 * | 3/2020 | Volpe | ................ G06F 17/18 |
| 2009/0106506 A1 * | 4/2009 | Skerlj | ................ G11C 11/4076 |
| | | | 711/E12.001 |
| 2015/0378956 A1 * | 12/2015 | Dearth | ................ G06F 13/4234 |
| | | | 710/308 |
| 2020/0034057 A1 | 1/2020 | Srinivasan et al. | |
| 2020/0257680 A1 * | 8/2020 | Danyi | ................ G06F 11/302 |

OTHER PUBLICATIONS

Https://access.redhat.com/documentation/en-us/red_hat_openstack_platform/9/html/configuration_reference_guide/ch_configuring-openstack-block-storage, downloaded on Feb. 23, 2022.
Https://github.com/lxc/lxd/blob/master/lxd/storage/utils.go, downloaded on Feb. 23, 2022.

* cited by examiner

*Primary Examiner* — Brian R Peugh
(74) *Attorney, Agent, or Firm* — Ryan, Mason & Lewis LLP

(57) ABSTRACT

Techniques are provided for latency-based detection of storage volume type. One method comprises sending read commands using a predefined read command sequence to a recipient storage volume, wherein the predefined read command sequence specifies a request size and/or an offset of at least two of the read commands, and wherein an entity associated with a recipient storage volume of a predefined storage volume type is configured to insert a predefined delay before sending a response to at least one of the read commands when the entity detects the predefined read command sequence; evaluating whether the response to at least one of the read commands comprises the predefined delay; and determining whether the recipient storage volume is the predefined storage volume type based on a result of the evaluating. The recipient storage volume may comprise a storage volume and/or a storage data client that exposes a virtual storage volume.

20 Claims, 6 Drawing Sheets

300

302 — SEND READ COMMANDS USING A PREDEFINED READ COMMAND SEQUENCE TO A RECIPIENT STORAGE VOLUME, WHEREIN AN ENTITY ASSOCIATED WITH A RECIPIENT STORAGE VOLUME OF AT LEAST ONE PREDEFINED STORAGE VOLUME TYPE IS CONFIGURED TO INSERT A PREDEFINED DELAY, RESPONSIVE TO THE ENTITY DETECTING THAT THE PLURALITY OF READ COMMANDS WAS SENT USING THE PREDEFINED READ COMMAND SEQUENCE, BEFORE SENDING A RESPONSE TO AT LEAST ONE OF THE PLURALITY OF READ COMMANDS

304 — EVALUATE WHETHER THE RESPONSE TO AT LEAST ONE OF THE PLURALITY OF READ COMMANDS COMPRISES THE PREDEFINED DELAY

306 — DETERMINE WHETHER THE RECIPIENT STORAGE VOLUME IS AT LEAST ONE OF THE AT LEAST ONE PREDEFINED STORAGE VOLUME TYPE BASED ON A RESULT OF THE EVALUATING

LATENCY-BASED DETECTION OF STORAGE VOLUME TYPE

FIELD

The field relates generally to information processing systems, and more particularly to storage in such information processing systems.

BACKGROUND

Information processing systems often include distributed storage systems comprising multiple storage nodes. These distributed storage systems are often reconfigurable in order to adapt, for example, the number and type of storage nodes and the corresponding system storage capacity as needed. In some cases, however, a misconfiguration of one or more components of such distributed storage systems, such as a misconfiguration of one or more storage volumes, can significantly impair performance of the information processing system.

A need therefore exists for improved techniques for detecting such misconfigurations based on a detection of a storage volume type.

SUMMARY

Illustrative embodiments provide techniques for latency-based detection of storage volume type. One exemplary method comprises sending a plurality of read commands using a predefined read command sequence to a recipient storage volume, wherein the predefined read command sequence specifies one or more of a request size and an offset of at least two of the plurality of read commands, and wherein an entity associated with a recipient storage volume of at least one predefined storage volume type is configured to insert a predefined delay, responsive to the entity detecting that the plurality of read commands was sent using the predefined read command sequence, before sending a response to at least one of the plurality of read commands; evaluating whether the response to at least one of the plurality of read commands comprises the predefined delay; and determining whether the recipient storage volume is at least one of the at least one predefined storage volume type based on a result of the evaluating.

In some embodiments, the entity may comprise one or more of a data server that serves a storage volume and a storage data client that exposes at least one virtual storage volume. At least one predefined action may be initiated based at least in part on the determined at least one predefined storage volume type, such as sending at least one notification of a configuration error.

In one or more embodiments, the at least one predefined storage volume type may comprise one or more of: (i) at least one virtual storage volume exposed by a storage data client of a host device due to a configuration error, and (ii) at least one storage volume of a given version.

These and other illustrative embodiments include, without limitation, apparatus, systems, methods and processor-readable storage media.

DETAILED DESCRIPTION

Illustrative embodiments will be described herein with reference to exemplary information processing systems and associated computers, servers, storage devices and other processing devices. It is to be appreciated, however, that these and other embodiments are not restricted to the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other cloud-based system that includes one or more clouds hosting multiple tenants that share cloud resources. Numerous different types of enterprise computing and storage systems are also encompassed by the term "information processing system" as that term is broadly used herein.

Figure 1A:
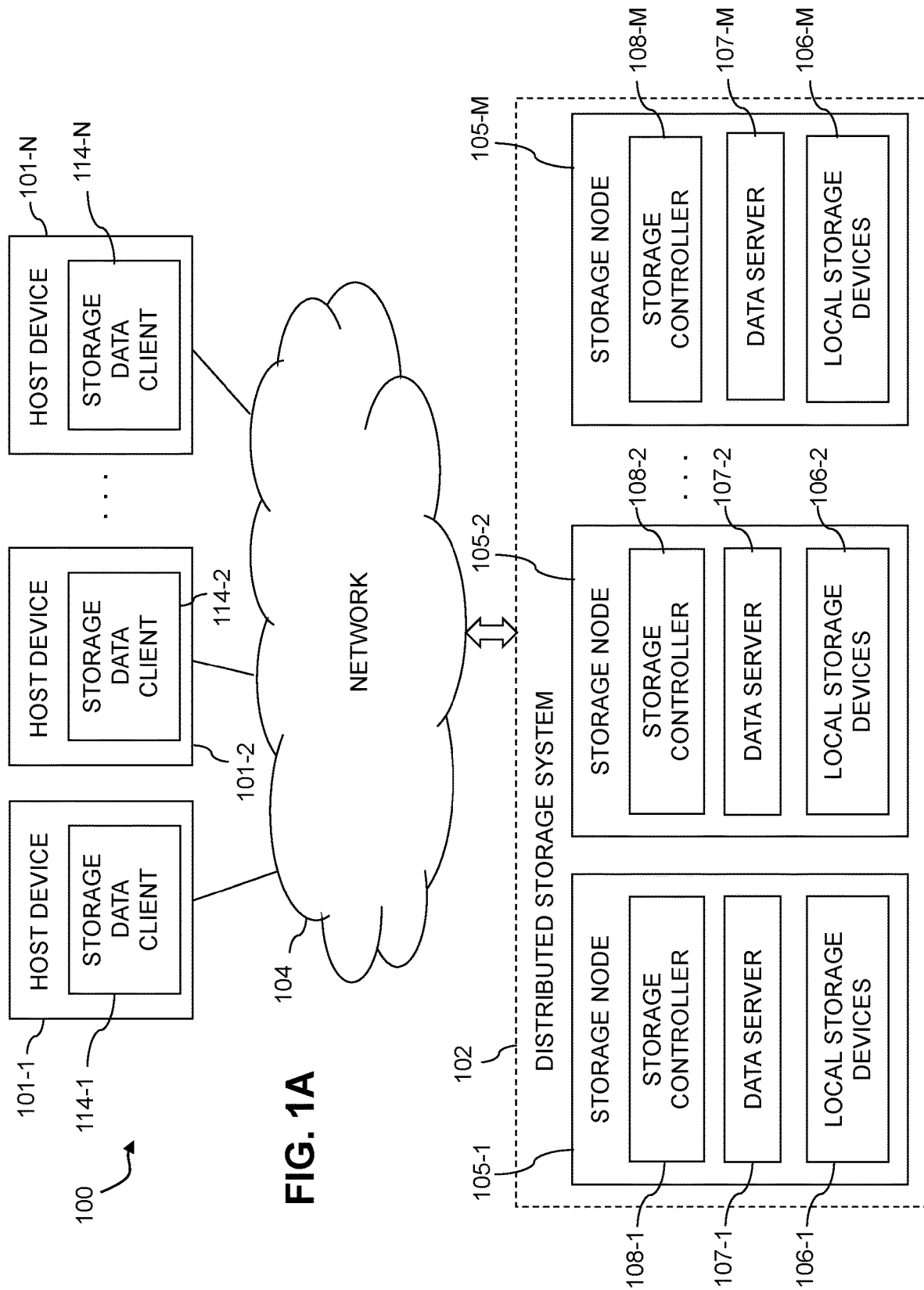
FIG. 1A is a block diagram of an information processing system incorporating functionality for latency-based detection of storage volume type in an illustrative embodiment.

FIG. 1A shows an information processing system 100 configured in accordance with an illustrative embodiment. The information processing system 100 comprises a plurality of host devices 101-1, 101-2, . . . 101-N, collectively referred to herein as host devices 101, and a distributed storage system 102 shared by the host devices 101. The host devices 101 and distributed storage system 102 in this embodiment are configured to communicate with one another via a network 104 that illustratively utilizes protocols such as Transmission Control Protocol (TCP) and/or Internet Protocol (IP), and may therefore be referred to herein as a TCP/IP network, although it is to be appreciated that the network 104 can operate using additional or alternative protocols. In some embodiments, the network 104 comprises a storage area network (SAN) that includes one or more Fibre Channel (FC) switches, Ethernet switches or other types of switch fabrics.

The distributed storage system 102 more particularly comprises a plurality of storage nodes 105-1, 105-2, . . . 105-M, collectively referred to herein as storage nodes 105. The values N and M in this embodiment denote arbitrary integer values that in the figure are illustrated as being greater than or equal to three, although other values such as N=1, N=2, M=1 or M=2 can be used in other embodiments.

The storage nodes 105 collectively form the distributed storage system 102, which is one possible example of what is more generally referred to herein as a "distributed storage system." Other distributed storage systems can include different numbers and arrangements of storage nodes, and possibly one or more additional components. For example, as indicated above, a distributed storage system in some embodiments may include only first and second storage nodes, corresponding to an M=2 embodiment. Some embodiments can configure a distributed storage system to include additional components.

In some embodiments, the distributed storage system 102 provides a logical address space that is divided among the storage nodes 105, such that different ones of the storage nodes 105 store the data for respective different portions of the logical address space. Accordingly, in these and other similar distributed storage system arrangements, different ones of the storage nodes 105 have responsibility for different portions of the logical address space.

Other types of distributed storage systems can be used in other embodiments. For example, distributed storage system 102 can comprise multiple distinct storage arrays, such as a production storage array and a backup storage array, possibly deployed at different locations. Accordingly, in some embodiments, one or more of the storage nodes 105 may each be viewed as a separate storage array with its own logical address space. Alternatively, the storage nodes 105 can be viewed as collectively comprising one or more storage arrays. The term "storage node" as used herein is therefore intended to be broadly construed.

In some embodiments, the distributed storage system 102 comprises a software-defined storage system and the storage nodes 105 comprise respective software-defined storage server nodes of the software-defined storage system, such nodes also being referred to herein as SDS server nodes, where SDS denotes software-defined storage. Accordingly, the number and types of storage nodes 105 can be dynamically expanded or contracted under software control in some embodiments.

Each of the storage nodes 105 is illustratively configured to interact with one or more of the host devices 101. The host devices 101 illustratively comprise servers or other types of computers of an enterprise computer system, cloud-based computer system or other arrangement of multiple compute nodes associated with respective users.

The host devices 101 in some embodiments illustratively provide compute services such as execution of one or more applications on behalf of each of one or more users associated with respective ones of the host devices 101. Such applications illustratively generate IO operations that are processed by a corresponding one of the storage nodes 105. The term "input-output" as used herein refers to at least one of input and output. For example, IO operations may comprise write requests and/or read requests directed to logical addresses of a particular logical storage volume of one or more of the storage nodes 105. These and other types of IO operations are also generally referred to herein as IO requests.

The IO operations that are currently being processed in the distributed storage system 102 in some embodiments are referred to herein as "in-flight" IOs that have been admitted by the storage nodes 105 for further processing within the system 100. The storage nodes 105 are illustratively configured to queue IO operations arriving from one or more of the host devices 101 in one or more sets of IO queues.

The storage nodes 105 illustratively comprise respective processing devices of one or more processing platforms. For example, the storage nodes 105 can each comprise one or more processing devices each having a processor and a memory, possibly implementing virtual machines and/or containers, although numerous other configurations are possible.

The storage nodes 105 can additionally or alternatively be part of cloud infrastructure, such as a cloud-based system implementing Storage-as-a-Service (STaaS) functionality.

The storage nodes 105 may be implemented on a common processing platform, or on separate processing platforms.

The host devices 101 are illustratively configured to write data to and read data from the distributed storage system 102 comprising storage nodes 105 in accordance with applications executing on those host devices 101 for system users.

The term "user" herein is intended to be broadly construed so as to encompass numerous arrangements of human, hardware, software or firmware entities, as well as combinations of such entities. Compute and/or storage services may be provided for users under a Platform-as-a-Service (PaaS) model, an Infrastructure-as-a-Service (IaaS) model and/or a Function-as-a-Service (FaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

Communications between the components of system 100 can take place over additional or alternative networks, including a global computer network such as the Internet, a wide area network (WAN), a local area network (LAN), a satellite network, a telephone or cable network, a cellular network such as 4G or 5G cellular network, a wireless network such as a WiFi or WiMAX network, or various portions or combinations of these and other types of networks. The system 100 in some embodiments therefore comprises one or more additional networks other than network 104 each comprising processing devices configured to communicate using TCP, IP and/or other communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand or Gigabit Ethernet, in addition to or in place of FC. Numerous alternative networking arrangements are possible in a given embodiment, as will be appreciated by those skilled in the art. Other examples include RDMA over Converged Ethernet (ROCE) or InfiniBand over Ethernet (IBoE).

The first storage node 105-1 comprises a plurality of storage devices 106-1, a data server 107-1, and an associated storage controller 108-1. The data server 107-1 (sometimes referred to as a "storage data server") provides access to data stored in the storage devices 106-1 of the respective storage node 105-1. The storage devices 106-1 store metadata pages and user data pages associated with one or more storage volumes of the distributed storage system 102. The storage volumes illustratively comprise respective logical units (LUNs) or other types of logical storage volumes. The storage devices 106-1 more particularly comprise local persistent storage devices of the first storage node 105-1. Such persistent storage devices are local to the first storage node 105-1, but remote from the second storage node 105-2, the storage node 105-M and any other ones of other storage nodes 105.

Each of the other storage nodes 105-2 through 105-M is assumed to be configured in a manner similar to that described above for the first storage node 105-1. Accordingly, by way of example, storage node 105-2 comprises a plurality of storage devices 106-2, a data server 107-2, and an associated storage controller 108-2, and storage node 105-M comprises a plurality of storage devices 106-M, a data server 107-M and an associated storage controller 108-M.

The storage devices 106-2 through 106-M store metadata pages and user data pages associated with one or more storage volumes of the distributed storage system 102, such as the above-noted LUNs. The storage devices 106-2 more particularly comprise local persistent storage devices of the storage node 105-2. Such persistent storage devices are local to the storage node 105-2, but remote from the first storage node 105-1, the storage node 105-M, and any other ones of the storage nodes 105. Similarly, the storage devices 106-M more particularly comprise local persistent storage devices of the storage node 105-M. Such persistent storage devices are local to the storage node 105-M, but remote from the first storage node 105-1, the second storage node 105-2, and any other ones of the storage nodes 105.

The local persistent storage of a given one of the storage nodes 105 illustratively comprises the particular local persistent storage devices that are implemented in or otherwise associated with that storage node. It is assumed that such local persistent storage devices of the given storage node are accessible to the storage controller of that node via a local interface, and are accessible to storage controllers 108 of respective other ones of the storage nodes 105 via remote interfaces. For example, it is assumed in some embodiments disclosed herein that each of the storage devices 106 on a given one of the storage nodes 105 can be accessed by the given storage node via its local interface, or by any of the other storage nodes via a remote direct memory access (RDMA) interface. A given storage application executing on the storage nodes 105 illustratively requires that all of the storage nodes 105 be able to access all of the storage devices 106. Such access to local persistent storage of each node from the other storage nodes can be performed, for example, using the RDMA interfaces with the other storage nodes, although numerous other arrangements are possible.

The storage controllers 108 of the storage nodes 105 may include additional modules and other components typically found in conventional implementations of storage controllers and storage systems, although such additional modules and other components are omitted from the figure for clarity and simplicity of illustration.

For example, the storage controllers 108 can comprise or be otherwise associated with one or more write caches and one or more write cache journals, both also illustratively distributed across the storage nodes 105 of the distributed storage system. It is further assumed in illustrative embodiments that one or more additional journals are provided in the distributed storage system, such as, for example, a metadata update journal and possibly other journals providing other types of journaling functionality for IO operations. Illustrative embodiments disclosed herein are assumed to be configured to perform various destaging processes for write caches and associated journals, and to perform additional or alternative functions in conjunction with processing of IO operations.

The storage devices 106 of the storage nodes 105 illustratively comprise solid state drives (SSDs). Such SSDs are implemented using non-volatile memory (NVM) devices such as flash memory. Other types of NVM devices that can be used to implement at least a portion of the storage devices 106 include non-volatile random access memory (NVRAM), phase-change RAM (PC-RAM), magnetic RAM (MRAM), resistive RAM, spin torque transfer magneto-resistive RAM (STT-MRAM), and Intel Optane™ devices based on 3D Point™ memory. These and various combinations of multiple different types of NVM devices may also be used. For example, hard disk drives (HDDs) can be used in combination with or in place of SSDs or other types of NVM devices.

However, it is to be appreciated that other types of storage devices can be used in other embodiments. For example, a given storage system as the term is broadly used herein can include a combination of different types of storage devices, as in the case of a multi-tier storage system comprising a flash-based fast tier and a disk-based capacity tier. In such an embodiment, each of the fast tier and the capacity tier of the multi-tier storage system comprises a plurality of storage devices with different types of storage devices being used in different ones of the storage tiers. For example, the fast tier may comprise flash drives while the capacity tier comprises HDDs. The particular storage devices used in a given storage tier may be varied in other embodiments, and multiple distinct storage device types may be used within a single storage tier. The term "storage device" as used herein is intended to be broadly construed, so as to encompass, for example, SSDs, HDDs, flash drives, hybrid drives or other types of storage devices. Such storage devices are examples of local persistent storage devices 106 of the storage nodes 105 of the distributed storage system of FIG. 1A.

In some embodiments, the storage nodes 105 of the distributed storage system collectively provide a scale-out storage system, although the storage nodes 105 can be used to implement other types of storage systems in other embodiments. One or more such storage nodes can be associated with at least one storage array. Additional or alternative types of storage products that can be used in implementing a given storage system in illustrative embodiments include software-defined storage, cloud storage and object-based storage. Combinations of multiple ones of these and other storage types can also be used.

As indicated above, the storage nodes 105 in some embodiments comprise respective software-defined storage server nodes of a software-defined storage system, in which the number and types of storage nodes 105 can be dynamically expanded or contracted under software control using software-defined storage techniques.

The term "storage system" as used herein is therefore intended to be broadly construed, and should not be viewed as being limited to certain types of storage systems, such as content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

In some embodiments, communications between the host devices 101 and the storage nodes 105 comprise Small Computer System Interface (SCSI) or Internet SCSI (iSCSI) commands. Other types of SCSI or non-SCSI commands may be used in other embodiments, including commands that are part of a standard command set, or custom commands such as a "vendor unique command" or VU command that is not part of a standard command set. The term "command" as used herein is therefore intended to be broadly construed, so as to encompass, for example, a composite command that comprises a combination of multiple individual commands. Numerous other commands can be used in other embodiments.

For example, although in some embodiments certain commands used by the host devices 101 to communicate with the storage nodes 105 illustratively comprise SCSI or iSCSI commands, other embodiments can implement 10 operations utilizing command features and functionality associated with NVM Express (NVMe), as described in the NVMe Specification, Revision 2.0a, July 2021, which is incorporated by reference herein. Other examples of NVMe storage access protocols that may be utilized in illustrative embodiments disclosed herein include NVMe over Fabrics, also referred to herein as NVMeF, and NVMe over TCP, also referred to herein as NVMe/TCP.

Some embodiments disclosed herein are configured to utilize one or more RAID arrangements to store data across the storage devices 106 in each of one or more of the storage nodes 105 of the distributed storage system 102.

The RAID arrangement can comprise, for example, a RAID 5 arrangement supporting recovery from a failure of a single one of the plurality of storage devices, a RAID 6 arrangement supporting recovery from simultaneous failure of up to two of the storage devices, or another type of RAID arrangement. For example, some embodiments can utilize RAID arrangements with redundancy higher than two.

The term "RAID arrangement" as used herein is intended to be broadly construed, and should not be viewed as limited to RAID 5, RAID 6 or other parity RAID arrangements. For example, a RAID arrangement in some embodiments can comprise combinations of multiple instances of distinct RAID approaches, such as a mixture of multiple distinct RAID types (e.g., RAID 1 and RAID 6) over the same set of storage devices, or a mixture of multiple stripe sets of different instances of one RAID type (e.g., two separate instances of RAID 5) over the same set of storage devices. Other types of parity RAID techniques and/or non-parity RAID techniques can be used in other embodiments.

Such a RAID arrangement is illustratively established by the storage controllers 108 of the respective storage nodes 105. The storage devices 106 in the context of RAID arrangements herein are also referred to as "disks" or "drives." A given such RAID arrangement may also be referred to in some embodiments herein as a "RAID array."

The RAID arrangement used in an illustrative embodiment includes an array of n different "disks" denoted 1 through n, each a different physical storage device of the storage devices 106. Multiple such physical storage devices are typically utilized to store data of a given LUN or other logical storage volume in the distributed storage system. For example, data pages or other data blocks of a given LUN or other logical storage volume can be "striped" along with its corresponding parity information across multiple ones of the disks in the RAID arrangement in accordance with RAID 5 or RAID 6 techniques.

A given RAID 5 arrangement defines block-level striping with single distributed parity and provides fault tolerance of a single drive failure, so that the array continues to operate with a single failed drive, irrespective of which drive fails. For example, in a conventional RAID 5 arrangement, each stripe includes multiple data blocks as well as a corresponding p parity block. The p parity blocks are associated with respective row parity information computed using well-known RAID 5 techniques. The data and parity blocks are distributed over the disks to support the above-noted single distributed parity and its associated fault tolerance.

A given RAID 6 arrangement defines block-level striping with double distributed parity and provides fault tolerance of up to two drive failures, so that the array continues to operate with up to two failed drives, irrespective of which two drives fail. For example, in a conventional RAID 6 arrangement, each stripe includes multiple data blocks as well as corresponding p and q parity blocks. The p and q parity blocks are associated with respective row parity information and diagonal parity information computed using well-known RAID 6 techniques. The data and parity blocks are distributed over the disks to collectively provide a diagonal-based configuration for the p and q parity information, so as to support the above-noted double distributed parity and its associated fault tolerance.

In such RAID arrangements, the parity blocks are typically not read unless needed for a rebuild process triggered by one or more storage device failures.

These and other references herein to RAID 5, RAID 6 and other particular RAID arrangements are only examples, and numerous other RAID arrangements can be used in other embodiments. Also, other embodiments can store data across the storage devices 106 of the storage nodes 105 without using RAID arrangements.

In some embodiments, the storage nodes 105 of the distributed storage system of FIG. 1A are connected to each other in a full mesh network, and are collectively managed by a system manager. A given set of local persistent storage devices 106 on a given one of the storage nodes 105 is illustratively implemented in a disk array enclosure (DAE) or other type of storage array enclosure of that storage node. Each of the storage nodes 105 illustratively comprises a CPU or other type of processor, a memory, a network interface card (NIC) or other type of network interface, and its corresponding storage devices 106, possibly arranged as part of a DAE of the storage node.

In some embodiments, different ones of the storage nodes 105 are associated with the same DAE or other type of storage array enclosure. The system manager is illustratively implemented as a management module or other similar management logic instance, possibly running on one or more of the storage nodes 105, on another storage node and/or on a separate non-storage node of the distributed storage system.

As a more particular non-limiting illustration, the storage nodes 105 in some embodiments are paired together in an arrangement referred to as a "brick," with each such brick being coupled to a different DAE comprising multiple drives, and each node in a brick being connected to the DAE and to each drive through a separate connection. The system manager may be running on one of the two nodes of a first one of the bricks of the distributed storage system. Again, numerous other arrangements of the storage nodes are possible in a given distributed storage system as disclosed herein.

The manner in which increased storage volume type detection functionality is implemented in system 100 will now be described in more detail.

In some embodiments, the data servers 107 of the storage nodes 105 are configured to consolidate the capacity of the storage devices 106 (e.g., HDDs, SSDs, PCIe or NVMe flash cards, etc.) of the storage nodes 105 into storage pools from which logical volumes are allocated, wherein the logical volumes (e.g., a block unit of storage management) are identified by, e.g., logical unit numbers (LUNs). More specifically, the data servers 107 of the storage nodes 105 are configured to create and manage storage pools (e.g., virtual pools of block storage) by aggregating storage capacity of the storage device 106 of the storage nodes 105 and dividing a given storage pool into one or more volumes, wherein the volumes are exposed to the host devices 101 as block devices. For example, a virtual block device can correspond to a volume of a storage pool. Each virtual block device comprises any number of actual physical storage devices, wherein each block device is preferably homogenous in terms of the type of storage devices that make up the block device (e.g., a block device can include only HDD devices or SSD devices, etc.).

The host devices 101-1, 101-2, . . . 101-N include respective instances of storage data clients 114-1, 114-2, . . . 114-N. Such instances of storage data clients 114 execute on the respective host device 101 and consume block storage exposed by the data servers 107 (e.g., to access data stored in the distributed storage system 102). In some embodiments, a storage data client 114 comprises a lightweight block device driver that is deployed on a given host device 101 to expose shared block volumes to the given host device 101. The storage data client 114 exposes the storage volumes as block devices to each application (e.g., virtual machine, container, etc.) that execute on the same server (e.g., a host device 101) on which the storage data client 114 is installed. The storage data client 114 of a given host device 101 exposes block devices representing the virtual storage volumes that are currently mapped to the given host device 101. The storage data client 114 for a given host device 101 serves as a block driver for the host device 101, wherein the storage data client 114 intercepts I/O requests, and utilizes the intercepted I/O request to access the block storage that is managed by the data servers 107. The storage data client 114 provides the operating system or hypervisor (which runs the storage data client 114) access to the logical block devices (e.g., volumes). Each storage data client 114 has knowledge of which data servers 107 hold (e.g., own) their block data, so multipathing can be accomplished natively through the storage data clients 114.

In some embodiments, IO operations are processed in the host devices 101 in the following manner. An application issues one or more IO operations through a storage data client 114 (sometimes referred to as an initiator or a kernel driver) on a given one of the host devices 101. The given host device 101 establishes a plurality of paths between at least one storage data client 114 of the given host device 101 and a plurality of targets of respective storage nodes 105 of the distributed storage system 102. For each of the IO operations generated by the application in the given host device 101 for delivery to the distributed storage system 102, given host device 101 determines a particular one of the storage nodes 105 that stores data for a logical storage volume and offset targeted by the IO operation, selects a particular one of the plurality of paths from the initiator to one of the targets on the particular storage node, and sends the IO operation to the particular storage node over the selected path.

The given host device above is an example of what is more generally referred to herein as "at least one processing device" that includes a processor coupled to a memory.

Figure 1B:
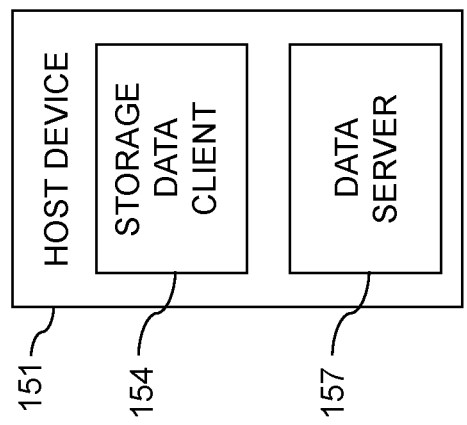
FIG. 1B illustrates a recursive configuration of one or more storage volumes associated with a host device in an illustrative embodiment.

As noted above, a misconfiguration of one or more components of such distributed storage systems, such as a misconfiguration of one or more storage volumes, can significantly impair performance. FIG. 1B illustrates a recursive configuration of one or more storage volumes of a host device 151 (e.g., a potential misconfiguration) in an illustrative embodiment. In the example of FIG. 1B, a storage data client 154 exposes one or more virtual storage volumes in the distributed storage system 102 and a data server 157 is installed on top of one of the storage volumes (in the distributed storage system 102) exposed by the storage data client 154, for example, due to a configuration error. The recursive configuration shown in FIG. 1B may severely impact performance of the exposed storage volume and should be avoided.

The disclosed techniques for latency-based detection of storage volume type may be used to detect the recursive configuration of the host device 151 of FIG. 1B. In this manner, a newly installed driver, such as the data server 157, that uses the storage volume communicates with the underlying storage volume (for example, by performing a series of read requests) to determine, for example, whether the storage volume is a native storage volume or a virtual storage volume.

Illustrative processes for implementing at least some of the above-described storage volume type detection functionality will be provided below in conjunction with the flow diagrams of FIGS. 2 and 3.

In some embodiments, the initiator of the given host device (e.g., the storage data client 114) and the targets of the respective storage nodes 105 are configured to support a designated standard storage access protocol, such as an NVMe access protocol or a SCSI access protocol. As more particular examples in the NVMe context, the designated storage access protocol may comprise an NVMeF or NVMe/TCP access protocol, although a wide variety of additional or alternative storage access protocols can be used in other embodiments.

As mentioned above, the distributed storage system 102 in some embodiments comprises a software-defined storage system and the storage nodes 105 comprise respective software-defined storage server nodes of the software-defined storage system.

The host devices 101 can comprise additional or alternative components. For example, in some embodiments the host devices 101 further comprise respective sets of IO queues and respective multi-path input-output (MPIO) drivers. The MPIO drivers collectively comprise a multi-path layer of the host devices 101. Path selection functionality for delivery of IO operations from the host devices 101 to the distributed storage system 102 is provided in the multi-path layer by respective instances of path selection logic implemented within the MPIO drivers. The MPIO drivers, such as NVMe/TCP drivers, thus allow IO operations from the host devices 101 to be sent to multiple NVMe/TCP targets.

The MPIO drivers may comprise, for example, otherwise conventional MPIO drivers, such as PowerPath® drivers from Dell Technologies, suitably modified in the manner disclosed herein to provide functionality for latency-based detection of storage volume type. Other types of MPIO drivers from other driver vendors may be suitably modified to incorporate functionality for storage volume type detection as disclosed herein.

In some embodiments, the host devices 101 comprise respective local caches, implemented using respective memories of those host devices. A given such local cache can be implemented using one or more cache cards. A wide variety of different caching techniques can be used in other embodiments, as will be appreciated by those skilled in the art. Other examples of memories of the respective host devices 101 that may be utilized to provide local caches include one or more memory cards or other memory devices, such as, for example, an NVMe over PCIe cache card, a local flash drive or other type of NVM storage drive, or combinations of these and other host memory devices.

The MPIO drivers are illustratively configured to deliver IO operations selected from their respective sets of IO queues to the distributed storage system 102 via selected ones of multiple paths over the network 104. The sources of the IO operations stored in the sets of IO queues illustratively include respective processes of one or more applications executing on the host devices 101. For example, IO operations can be generated by each of multiple processes of a database application running on one or more of the host devices 101. Such processes issue IO operations for delivery to the distributed storage system 102 over the network 104.

Other types of sources of IO operations may be present in a given implementation of system 100.

A given IO operation is therefore illustratively generated by a process of an application running on a given one of the host devices 101, and is queued in one of the IO queues of the given host device with other operations generated by other processes of that application, and possibly other processes of other applications.

The paths from the given host device to the distributed storage system 102 illustratively comprise paths associated with respective initiator-target pairs, with each initiator comprising a host bus adaptor (HBA) or other initiating entity of the given host device and each target comprising a port or other targeted entity corresponding to one or more of the storage devices 106 of the distributed storage system 102. As noted above, the storage devices 106 illustratively comprise LUNs or other types of logical storage devices.

In some embodiments, the paths are associated with respective communication links between the given host device and the distributed storage system 102 with each such communication link having a negotiated link speed. For example, in conjunction with registration of a given HBA to a switch of the network 104, the HBA and the switch may negotiate a link speed. The actual link speed that can be achieved in practice in some cases is less than the negotiated link speed, which is a theoretical maximum value.

In some embodiments, at least a portion of the initiators comprise virtual initiators, such as, for example, respective ones of a plurality of N-Port ID Virtualization (NPIV) initiators associated with one or more Fibre Channel (FC) network connections. Such initiators illustratively utilize NVMe arrangements such as NVMe/FC, although other protocols can be used. Other embodiments can utilize other types of virtual initiators in which multiple network addresses can be supported by a single network interface, such as, for example, multiple media access control (MAC) addresses on a single network interface of an Ethernet network interface card (NIC).

Accordingly, in some embodiments, the multiple virtual initiators are identified by respective ones of a plurality of media MAC addresses of a single network interface of a NIC. Such initiators illustratively utilize NVMe arrangements such as NVMe/TCP, although again other protocols can be used.

In some embodiments, the NPIV feature of FC allows a single host HBA port to expose multiple World Wide Numbers (WWNs) to the network 104 and the distributed storage system 102. A WWN or World Wide Identifier (WWID) is a unique identifier used in various types of storage technologies that may be implemented in illustrative embodiments herein, including, for example, SCSI, NVMe, FC, Parallel Advanced Technology Attachment (PATA), Serial Advanced Technology Attachment (SATA), Serial Attached SCSI (SAS) and others, and may be viewed as an example of what is more generally referred to herein as a virtual identifier. The NPIV feature is used, for example, when there are multiple IO producers on a given one of the host devices 101 with a need to distinguish which IO is related to which producer. One such case is a system involving virtual machines (VMs), where multiple VMs run on a single ESXi server with HBAs. All VMs are using all HBAs but there is a need to be able to distinguish which IO belongs to which VM, for example, in order to implement service level objectives (SLOs) between the various VMs, illustratively at an OS level. Each of the NPIV initiators behaves as if it is a "normal" or physical initiator, in that it logs into a storage array port, requires masking, etc. Another example of NPIV usage is in the context of AIX servers, where different logical partitions each use a different NPIV initiator over the same host HBA port.

Accordingly, in some embodiments, multiple virtual initiators are associated with a single HBA of a given one of the host devices 101 but have respective unique identifiers associated therewith.

Additionally or alternatively, different ones of the multiple virtual initiators are illustratively associated with respective different ones of a plurality of virtual machines of the given host device that share a single HBA of the given host device, or a plurality of logical partitions of the given host device that share a single HBA of the given host device.

Again, numerous alternative virtual initiator arrangements are possible, as will be apparent to those skilled in the art. The term "virtual initiator" as used herein is therefore intended to be broadly construed. It is also to be appreciated that other embodiments need not utilize any virtual initiators. References herein to the term "initiators" are intended to be broadly construed, and should therefore be understood to encompass physical initiators, virtual initiators, or combinations of both physical and virtual initiators.

Various scheduling algorithms, load balancing algorithms and/or other types of algorithms can be utilized by the MPIO driver of the given host device in delivering IO operations from the IO queues of that host device to the distributed storage system 102 over particular paths via the network 104. Each such IO operation is assumed to comprise one or more commands for instructing the distributed storage system 102 to perform particular types of storage-related functions such as reading data from or writing data to particular logical volumes of the distributed storage system 102. Such commands are assumed to have various payload sizes associated therewith, and the payload associated with a given command is referred to herein as its "command payload."

A command directed by the given host device to the distributed storage system 102 is considered an "outstanding" command until such time as its execution is completed in the viewpoint of the given host device, at which time it is considered a "completed" command. The commands illustratively comprise respective SCSI commands, although other command formats can be used in other embodiments. A given such command is illustratively defined by a corresponding command descriptor block (CDB) or similar format construct. The given command can have multiple blocks of payload associated therewith, such as a particular number 512-byte SCSI blocks or other types of blocks.

In one or more illustrative embodiments, it is assumed without limitation that the initiators of a plurality of initiator-target pairs comprise respective HBAs of the given host device and that the targets of the plurality of initiator-target pairs comprise respective ports of the distributed storage system 102. A wide variety of other types and arrangements of initiators and targets can be used in other embodiments.

Selecting a particular one of multiple available paths for delivery of a selected one of the IO operations from the given host device is more generally referred to herein as "path selection." Path selection as that term is broadly used herein can in some cases involve both selection of a particular IO operation and selection of one of multiple possible paths for accessing a corresponding logical device of the distributed storage system 102. The corresponding logical device illustratively comprises a LUN or other logical storage volume to which the particular IO operation is directed.

It should be noted that paths may be added or deleted between the host devices 101 and the distributed storage system 102 in the system 100. For example, the addition of one or more new paths from the given host device to the distributed storage system 102 or the deletion of one or more existing paths from the given host device to the distributed storage system 102 may result from respective addition or deletion of at least a portion of the storage devices 106 of the distributed storage system 102.

In some embodiments, paths are added or deleted in conjunction with addition of a new storage array or deletion of an existing storage array from a storage system that includes multiple storage arrays, possibly in conjunction with configuration of the storage system for at least one of a migration operation and a replication operation.

For example, a storage system may include first and second storage arrays, with data being migrated from the first storage array to the second storage array prior to removing the first storage array from the storage system.

As another example, a storage system may include a production storage array and a recovery storage array, with data being replicated from the production storage array to the recovery storage array so as to be available for data recovery in the event of a failure involving the production storage array.

In these and other situations, path discovery scans may be repeated as needed in order to discover the addition of new paths or the deletion of existing paths.

A given path discovery scan can be performed utilizing known functionality of conventional MPIO drivers, such as PowerPath® drivers.

The path discovery scan in some embodiments may be further configured to identify one or more new LUNs or other logical storage volumes associated with the one or more new paths identified in the path discovery scan. The path discovery scan may comprise, for example, one or more bus scans which are configured to discover the appearance of any new LUNs that have been added to the distributed storage system 102 as well to discover the disappearance of any existing LUNs that have been deleted from the distributed storage system 102.

The MPIO driver of the given host device in some embodiments comprises a user-space portion and a kernel-space portion. The kernel-space portion of the MPIO driver may be configured to detect one or more path changes of the type mentioned above, and to instruct the user-space portion of the MPIO driver to run a path discovery scan responsive to the detected path changes. Other divisions of functionality between the user-space portion and the kernel-space portion of the MPIO driver are possible. The user-space portion of the MPIO driver is illustratively associated with an Operating System (OS) kernel of the given host device.

For each of one or more new paths identified in the path discovery scan, the given host device may be configured to execute a host registration operation for that path. The host registration operation for a given new path illustratively provides notification to the distributed storage system 102 that the given host device has discovered the new path.

As indicated previously, the storage nodes 105 of the distributed storage system 102 process IO operations from one or more host devices 101 and in processing those IO operations run various storage application processes that generally involve interaction of that storage node with one or more other ones of the storage nodes.

In the FIG. 1A embodiment, the distributed storage system 102 comprises storage controllers 108 and corresponding sets of storage devices 106, and may include additional or alternative components, such as sets of local caches.

The storage controllers 108 illustratively control the processing of IO operations received in the distributed storage system 102 from the host devices 101. For example, the storage controllers 108 illustratively manage the processing of read and write commands directed by the MPIO drivers of the host devices 101 to particular ones of the storage devices 106. The storage controllers 108 can be implemented as respective storage processors, directors or other storage system components configured to control storage system operations relating to processing of IO operations. In some embodiments, each of the storage controllers 108 has a different one of the above-noted local caches associated therewith, although numerous alternative arrangements are possible.

An additional example of an illustrative process for implementing at least some of the above-described storage volume type detection functionality will be provided below in conjunction with the flow diagrams of FIGS. 2 and 3.

As indicated previously, the storage nodes 105 collectively comprise an example of a distributed storage system. The term "distributed storage system" as used herein is intended to be broadly construed, so as to encompass, for example, scale-out storage systems, clustered storage systems or other types of storage systems distributed over multiple storage nodes.

As another example, the storage nodes 105 in some embodiments are part of a distributed content addressable storage system in which logical addresses of data pages are mapped to physical addresses of the data pages in the storage devices 106 using respective hash digests, hash handles or other content-based signatures that are generated from those data pages using a secure hashing algorithm. A wide variety of other types of distributed storage systems can be used in other embodiments.

Also, the term "storage volume" as used herein is intended to be broadly construed, and should not be viewed as being limited to any particular format or configuration.

In some embodiments, the storage nodes 105 are implemented using processing modules that are interconnected in a full mesh network, such that a process of one of the processing modules can communicate with processes of any of the other processing modules. Commands issued by the processes can include, for example, remote procedure calls (RPCs) directed to other ones of the processes.

The sets of processing modules of the storage nodes 105 illustratively comprise control modules, data modules, routing modules and at least one management module. Again, these and possibly other processing modules of the storage nodes 105 are illustratively interconnected with one another in the full mesh network, such that each of the modules can communicate with each of the other modules, although other types of networks and different module interconnection arrangements can be used in other embodiments.

The management module in such an embodiment may more particularly comprise a system-wide management module, also referred to herein as a system manager. Other embodiments can include multiple instances of the management module implemented on different ones of the storage nodes 105.

A wide variety of alternative configurations of nodes and processing modules are possible in other embodiments. Also, the term "storage node" as used herein is intended to be broadly construed, and may comprise a node that implements storage control functionality but does not necessarily incorporate storage devices. As mentioned previously, a given storage node can in some embodiments comprise a separate storage array, or a portion of a storage array that includes multiple such storage nodes.

Communication links may be established between the various processing modules of the storage nodes using well-known communication protocols such as TCP/IP and RDMA. For example, respective sets of IP links used in data transfer and corresponding messaging could be associated with respective different ones of the routing modules.

The particular features described above in conjunction with FIG. 1A should not be construed as limiting in any way, and a wide variety of other system arrangements utilizing functionality for latency-based detection of storage volume type are possible.

The storage nodes 105 of the example distributed storage system 102 illustrated in FIG. 1A are assumed to be implemented using at least one processing platform, with each such processing platform comprising one or more processing devices, and each such processing device comprising a processor coupled to a memory. Such processing devices can illustratively include particular arrangements of compute, storage and network resources.

The storage nodes 105 may be implemented on respective distinct processing platforms, although numerous other arrangements are possible. At least portions of their associated host devices 101 may be implemented on the same processing platforms as the storage nodes 105 or on separate processing platforms.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for different subsets of the host devices 101 and the storage nodes 105 to reside in different data centers. Numerous other distributed implementations of the storage nodes 105 and their respective associated sets of host devices 101 are possible.

Additional examples of processing platforms utilized to implement storage systems and possibly their associated host devices in illustrative embodiments will be described in more detail below in conjunction with FIGS. 4 and 5.

It is to be appreciated that these and other features of illustrative embodiments are presented by way of example only, and should not be construed as limiting in any way.

Accordingly, different numbers, types and arrangements of system components such as host devices 101, distributed storage system 102, storage nodes 105, storage devices 106 and storage controllers 108 can be used in other embodiments.

It should be understood that the particular sets of modules and other components implemented in a distributed storage system as illustrated in FIG. 1A are presented by way of example only. In other embodiments, only subsets of these components, or additional or alternative sets of components, may be used, and such components may exhibit alternative functionality and configurations.

For example, in other embodiments, certain portions of storage volume type detection functionality as disclosed herein can be implemented in one or more host devices, in a storage system, or partially in a host device and partially in a storage system. Accordingly, illustrative embodiments are not limited to arrangements in which latency-based detection of storage volume type functionality is implemented, and therefore such embodiments encompass various alternative arrangements, such as, for example, an arrangement in which the functionality is implemented at least in part in a storage system, or distributed over one or more storage systems and one or more associated host devices, each comprising one or more processing devices. The term "at least one processing device" as used herein is therefore intended to be broadly construed.

The operation of the information processing system 100 will now be described in further detail with reference to the flow diagram of the illustrative embodiments of FIGS. 2 and 3, which illustrate processes for implementing storage volume type detection.

Figure 2:
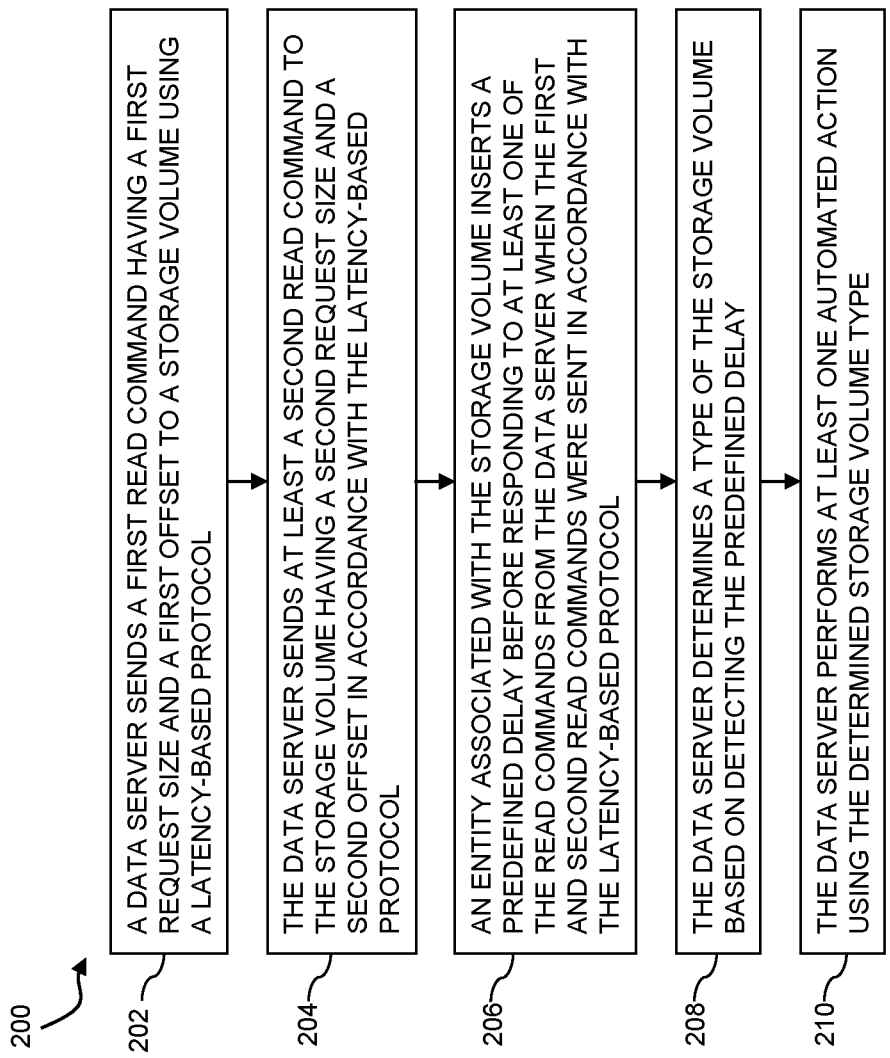
FIGS. 2 and 3 are flow diagrams of a process for storage volume type detection in illustrative embodiments.

The storage volume type detection process 200 illustrated in FIG. 2 includes steps 202, 204, 206, 208 and 210. In the example of FIG. 2, a data server (such as the newly installed data server 157 in the recursive configuration example of FIG. 1B) issues an IO sequence to a receiving storage volume in accordance with a latency-based protocol, and determines a type of the receiving storage volume based on whether or not the receiving storage volume adds a delay to one or more of the responses to the IO sequence. An entity associated with the receiving storage volume that receives the IO sequence will be configured with the functions and/or logic to detect whether a received IO sequence was sent in accordance with the latency-based protocol, and to add the specified delay when the latency-based protocol is detected. The entity may be, for example, the storage data client 154, in the given host device 151 in the potential misconfiguration example of FIG. 1B, that exposes a storage volume in the distributed storage system 102, or a data server 107 that serves the exposed storage volume in the distributed storage system 102. In at least some embodiments, the receiving storage volume can be a storage volume, served by a data server 107, in the distributed storage system 102 or a virtual storage volume exposed by a storage data client 114 on a given host device 101.

In step 202, a data server sends a first read command having a first request size and a first offset to a storage volume using a latency-based protocol. The data server may comprise, for example, the data server 157 in the recursive configuration example of FIG. 1B, or another data server interested in the type of a recipient storage volume that has been configured to employ the latency-based protocol to perform storage volume type detection. The latency-based protocol defines a read command sequence that specifies a request size and/or an offset of at least two of multiple read commands. The data server then sends at least a second read command in step 204 having a second request size and a second offset in accordance with the latency-based protocol. Steps 202 and 204 may be repeated in some embodiments to improve performance and/or reliability of the storage volume type detection process 200.

In step 206, an entity associated with the storage volume inserts a predefined delay before responding to at least one of the read commands from the data server when the first and second read commands were sent in accordance with the latency-based protocol. The entity may comprise, for example, a storage data client 154, a data server 107 in the distributed storage system 102 or another data server configured to insert the appropriate delay in response to detecting the presence of the latency-based protocol for storage volume type detection. The data server then determines a type of the receiving storage volume in step 208 based on detecting the predefined delay. For example, the storage volume type may indicate that the storage volume is actually a virtual storage volume in the distributed storage system 102, in a similar manner as the potential misconfiguration example of FIG. 1B.

In step 210, the data server performs at least one automated action using the determined storage volume type (such as sending a notification of a recursive configuration).

The steps of the FIG. 2 process are shown in sequential order for clarity and simplicity of illustration only, and certain steps can at least partially overlap with other steps. Additional or alternative steps can be used in other embodiments.

Figure 3:
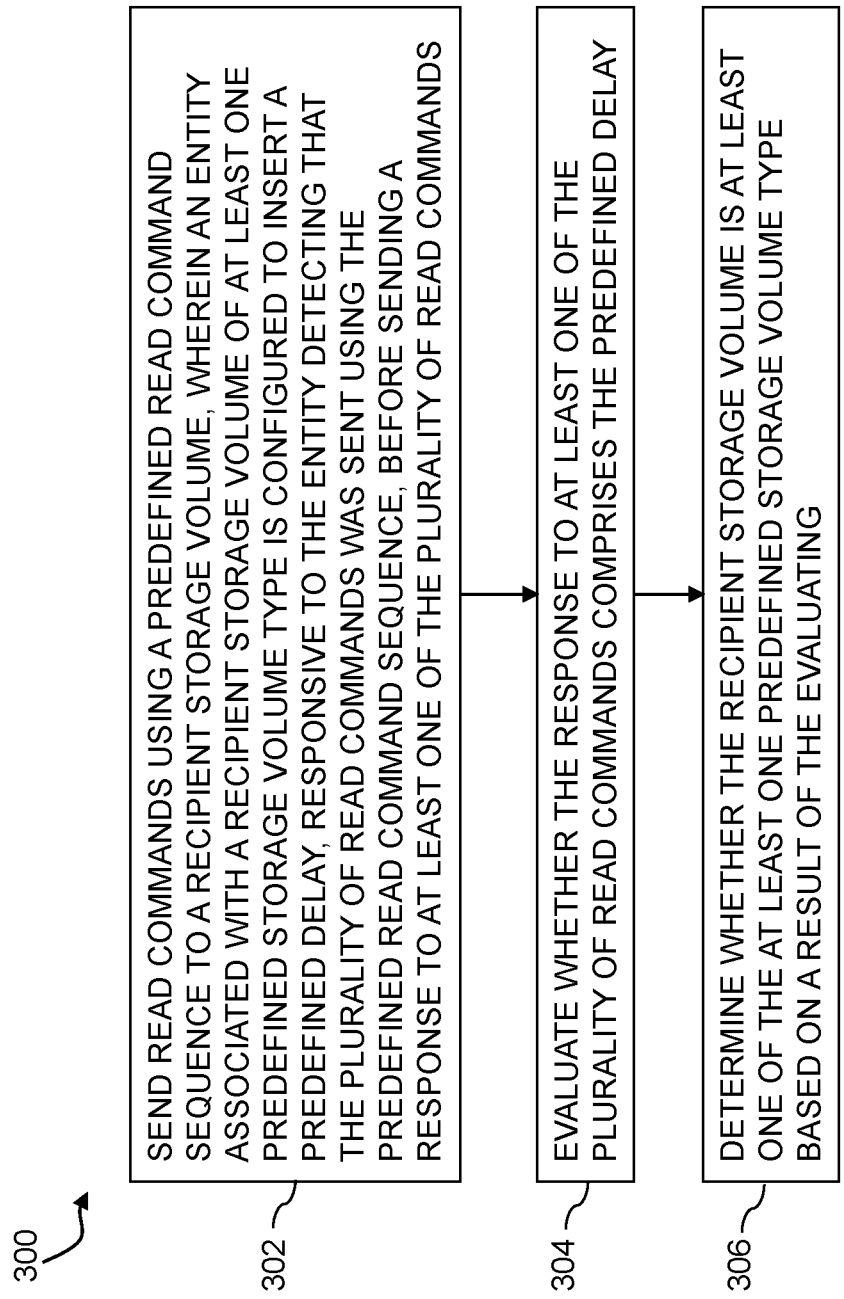

The storage volume type detection process 300 illustrated in FIG. 3 includes steps 302, 304 and 306, and is assumed to be implemented primarily by a particular one of the host devices 101 utilizing a data server (such as the newly installed data server 157 in the potential misconfiguration example of FIG. 1B). In step 302, read commands are sent using a predefined read command sequence to a recipient storage volume, wherein the predefined read command sequence specifies one or more of a request size and an offset of at least two of the plurality of read commands, and wherein an entity associated with a recipient storage volume of at least one predefined storage volume type is configured to insert a predefined delay, responsive to the entity detecting that the plurality of read commands was sent using the predefined read command sequence, before sending a response to at least one of the plurality of read commands.

In step 304, the exemplary storage volume type detection process 300 evaluates whether the response to at least one of the plurality of read commands comprises the predefined delay. A determination is made in step 306 as to whether the recipient storage volume is at least one of the at least one predefined storage volume type based on a result of the evaluating (such as the predefined storage volume type of a storage volume, being accessed by data server 157, that is exposed by the storage data client 154, as discussed above in conjunction with FIG. 1B).

In some embodiments, the entity may comprise a data server 107 in the distributed storage system 102 that serves a storage volume and/or a storage data client 154 in a host device that exposes at least one virtual storage volume. At least one predefined action may be initiated based at least in part on the determined at least one predefined storage volume type, such as sending at least one notification of a configuration error.

In one or more embodiments, the at least one predefined storage volume type may comprise one or more of: (i) at least one virtual storage volume exposed by a storage data client 154 of a host device 151 due to a configuration error, and (ii) at least one storage volume of a given version (e.g., different software and/or firmware associated with a given storage volume). A different predefined read command sequence may be associated with each of a plurality of the at least one predefined storage volume type (for example, the different predefined storage volume types may comprise the recursive configuration of at least one storage volume, as discussed above in conjunction with FIG. 1B, and one or more different storage volume versions (e.g., different software and/or firmware associated with a given storage volume). The different predefined read command sequence for a given predefined storage volume type may comprise a different request size and/or offset of at least two of multiple read commands of the predefined read command sequence, relative to the predefined read command sequences associated with other predefined storage volume types.

The steps of the FIG. 3 process are shown in sequential order for clarity and simplicity of illustration only, and certain steps can at least partially overlap with other steps. Additional or alternative steps can be used in other embodiments.

The particular processing operations and other system functionality described in conjunction with the flow diagram of FIGS. 2 and 3 are presented by way of illustrative example only, and should not be construed as limiting the scope of the disclosure in any way. Alternative embodiments can use other types of processing operations for implementing functionality for latency-based detection of storage volume type. For example, as indicated above, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to implement a plurality of different processes for latency-based detection of storage volume type for respective different applications executing on one or more host devices of an information processing system.

Functionality such as that described in conjunction with the flow diagram of FIGS. 2 and 3 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

These and other embodiments disclosed herein provide significant advantages over conventional approaches.

For example, illustrative embodiments provide functionality for storage volume type detection implemented by a host device and/or other system components configured to interact with storage nodes of a distributed storage system over one or more networks.

Some embodiments advantageously facilitate the usage of advanced storage access protocols such as NVMeF or NVMe/TCP in software-defined storage systems and other types of distributed storage systems while avoiding the drawbacks of conventional practice such as excessive costs and complexity for system redesign.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement host devices and distributed storage systems with storage volume type detection functionality will now be described in greater detail with reference to FIGS. 4 and 5. Although described in the context of system 100, these platforms may also be used to implement at least portions of other information processing systems in other embodiments.

Figure 4:
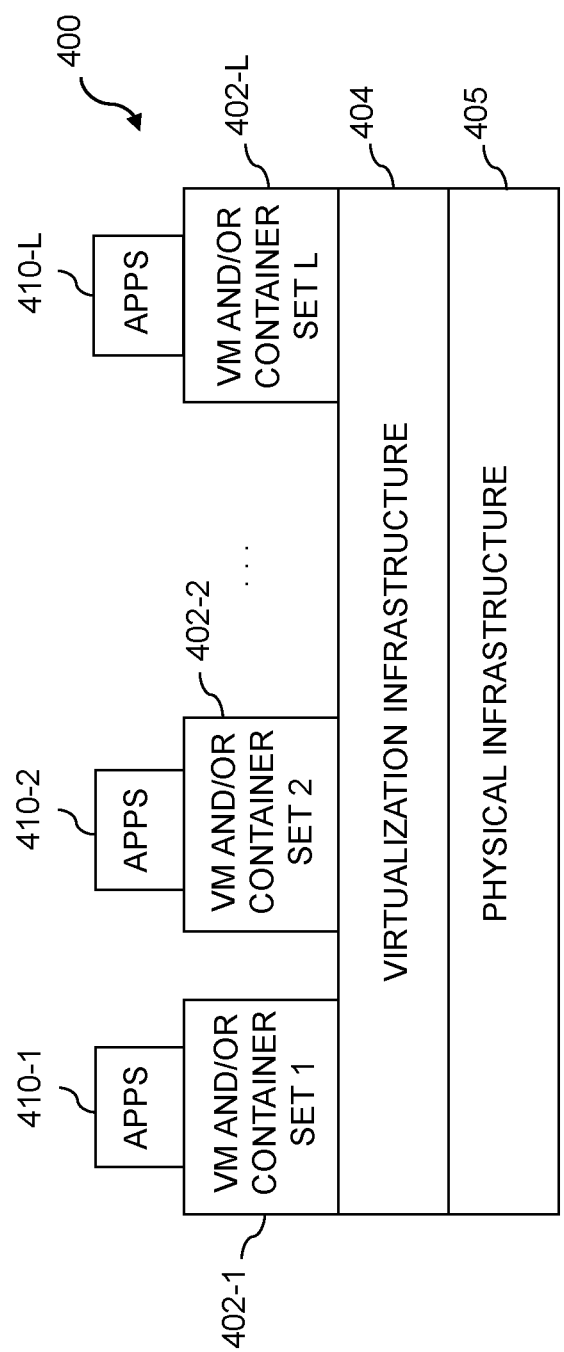
FIGS. 4 and 5 show examples of processing platforms that may be utilized to implement at least a portion of an information processing system in illustrative embodiments.
Figure 5:
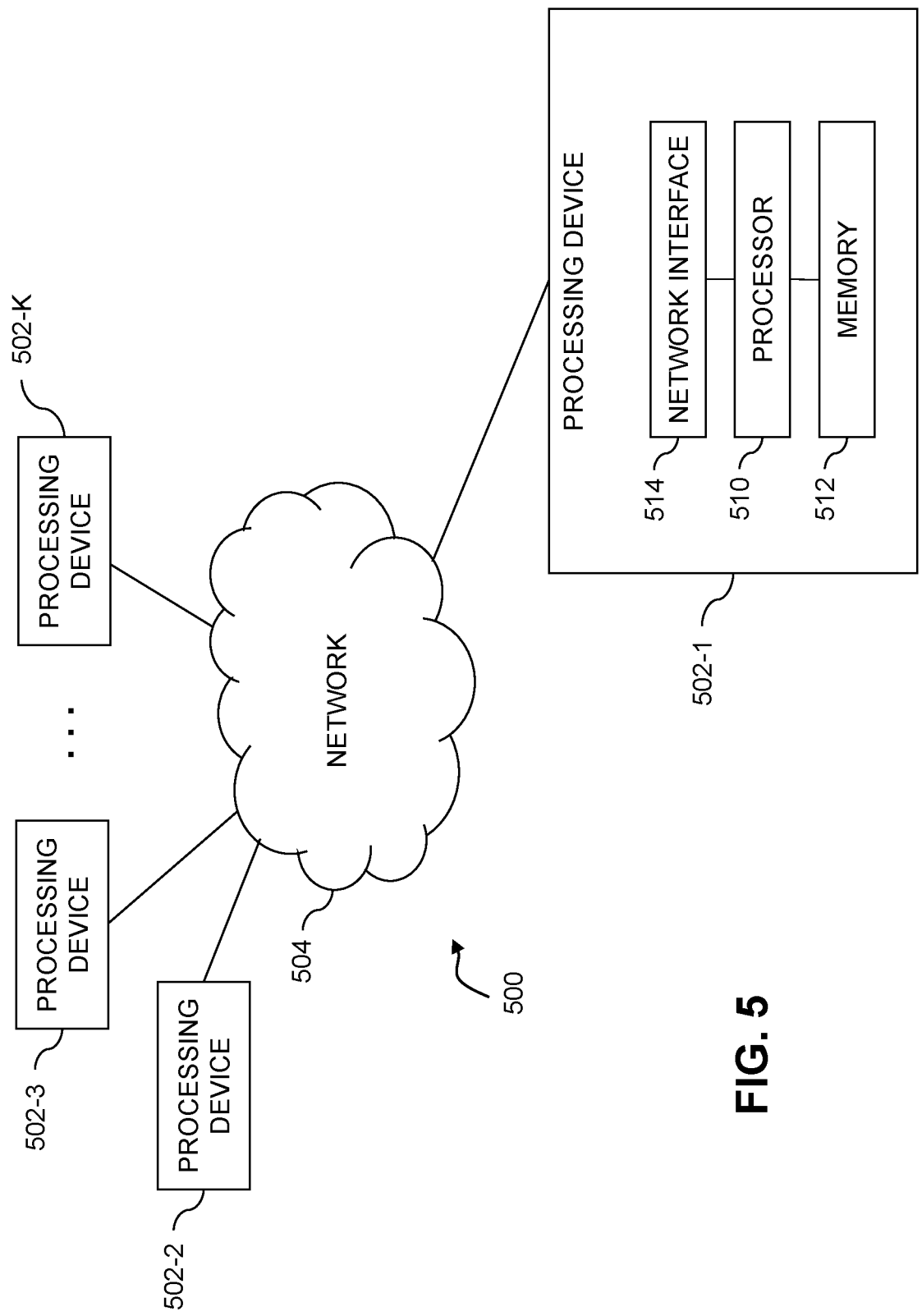

FIG. 4 shows an example processing platform comprising cloud infrastructure 400. The cloud infrastructure 400 comprises a combination of physical and virtual processing resources that may be utilized to implement at least a portion of the information processing system 100. The cloud infrastructure 400 comprises multiple virtual machines (VMs) and/or container sets 402-1, 402-2, . . . 402-L implemented using virtualization infrastructure 404. The virtualization infrastructure 404 runs on physical infrastructure 405, and illustratively comprises one or more hypervisors and/or operating system level virtualization infrastructure. The operating system level virtualization infrastructure illustratively comprises kernel control groups of a Linux operating system or other type of operating system.

The cloud infrastructure 400 further comprises sets of applications 410-1, 410-2, . . . 410-L running on respective ones of the VMs/container sets 402-1, 402-2, . . . 402-L under the control of the virtualization infrastructure 404. The VMs/container sets 402 may comprise respective VMs, respective sets of one or more containers, or respective sets of one or more containers running in VMs.

In some implementations of the FIG. 4 embodiment, the VMs/container sets 402 comprise respective VMs implemented using virtualization infrastructure 404 that comprises at least one hypervisor. Such implementations can provide storage volume type detection functionality in a distributed storage system of the type described above using one or more processes running on a given one of the VMs. For example, each of the VMs can implement logic instances and/or other components for implementing functionality associated with storage volume type detection in the system 100.

A hypervisor platform may be used to implement a hypervisor within the virtualization infrastructure 404. Such a hypervisor platform may comprise an associated virtual infrastructure management system. The underlying physical machines may comprise one or more distributed processing platforms that include one or more storage systems.

In other implementations of the FIG. 4 embodiment, the VMs/container sets 402 comprise respective containers implemented using virtualization infrastructure 404 that provides operating system level virtualization functionality, such as support for Docker containers running on bare metal hosts, or Docker containers running on VMs. The containers are illustratively implemented using respective kernel control groups of the operating system. Such implementations can also provide storage volume type detection functionality in a distributed storage system of the type described above. For example, a container host device supporting multiple containers of one or more container sets can implement logic instances and/or other components for implementing storage volume type detection functionality in the system 100.

As is apparent from the above, one or more of the processing devices or other components of system 100 may each run on a computer, server, storage device or other processing platform element. A given such element may be viewed as an example of what is more generally referred to herein as a "processing device." The cloud infrastructure 400 shown in FIG. 4 may represent at least a portion of one processing platform. Another example of such a processing platform is processing platform 500 shown in FIG. 5.

The processing platform 500 in this embodiment comprises a portion of system 100 and includes a plurality of processing devices, denoted 502-1, 502-2, 502-3, . . . 502-K, which communicate with one another over a network 504.

The network 504 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 502-1 in the processing platform 500 comprises a processor 510 coupled to a memory 512.

The processor 510 may comprise a microprocessor, a microcontroller, an application-specific integrated circuit (ASIC), a field-programmable gate array (FPGA), graphics processing unit (GPU) or other type of processing circuitry, as well as portions or combinations of such circuitry elements.

The memory 512 may comprise random access memory (RAM), read-only memory (ROM), flash memory or other types of memory, in any combination. The memory 512 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 502-1 is network interface circuitry 514, which is used to interface the processing device with the network 504 and other system components, and may comprise conventional transceivers.

The other processing devices 502 of the processing platform 500 are assumed to be configured in a manner similar to that shown for processing device 502-1 in the figure.

Again, the particular processing platform 500 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise various arrangements of converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the storage volume type detection functionality provided by one or more components of a storage system as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, host devices, storage systems, storage nodes, storage devices, storage controllers, initiators, targets, and other components. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising:

sending a plurality of read commands using a predefined read command sequence to a recipient storage volume, wherein the predefined read command sequence specifies one or more of a request size and an offset of at least two of the plurality of read commands, and wherein an entity associated with a recipient storage volume of at least one predefined storage volume type is configured to insert a predefined delay, responsive to the entity detecting that the plurality of read commands was sent using the predefined read command sequence, before sending a response to at least one of the plurality of read commands;

evaluating whether the response to at least one of the plurality of read commands comprises the predefined delay; and determining whether the recipient storage volume is at least one of the at least one predefined storage volume type based on a result of the evaluating;

wherein the method is performed by at least one processing device comprising a processor coupled to a memory.

2. The method of claim 1, wherein the entity comprises one or more of a data server that serves a storage volume and a storage data client that exposes at least one virtual storage volume.

3. The method of claim 1, further comprising initiating at least one predefined action based at least in part on the determined at least one predefined storage volume type.

4. The method of claim 3, wherein the at least one predefined action comprises sending at least one notification of a configuration error.

5. The method of claim 1, further comprising repeating the predefined read command sequence at least one additional time.

6. The method of claim 1, wherein the at least one predefined storage volume type comprises one or more of: (i) at least one virtual storage volume exposed by a storage data client of a host device due to a configuration error, and (ii) at least one storage volume of a given version.

7. The method of claim 1, wherein the predefined delay comprises one or more of: a specified delay duration and at least a specified minimum delay.

8. The method of claim 1, wherein a different predefined read command sequence is associated with each of a plurality of the at least one predefined storage volume type.

9. An apparatus comprising:

at least one processing device comprising a processor coupled to a memory;

the at least one processing device being configured to implement the following steps:

sending a plurality of read commands using a predefined read command sequence to a recipient storage volume, wherein the predefined read command sequence specifies one or more of a request size and an offset of at least two of the plurality of read commands, and wherein an entity associated with a recipient storage volume of at least one predefined storage volume type is configured to insert a predefined delay, responsive to the entity detecting that the plurality of read commands was sent using the predefined read command sequence, before sending a response to at least one of the plurality of read commands;

evaluating whether the response to at least one of the plurality of read commands comprises the predefined delay; and determining whether the recipient storage volume is at least one of the at least one predefined storage volume type based on a result of the evaluating.

10. The apparatus of claim 9, wherein the entity comprises one or more of a data server that serves a storage volume and a storage data client that exposes at least one virtual storage volume.

11. The apparatus of claim 9, further comprising initiating at least one predefined action based at least in part on the determined at least one predefined storage volume type.

12. The apparatus of claim 9, further comprising repeating the predefined read command sequence at least one additional time.

13. The apparatus of claim 9, wherein the at least one predefined storage volume type comprises one or more of: (i) at least one virtual storage volume exposed by a storage data client of a host device due to a configuration error, and (ii) at least one storage volume of a given version.

14. A non-transitory processor-readable storage medium having stored therein program code of one or more software programs, wherein the program code when executed by at least one processing device causes the at least one processing device to perform the following steps:

sending a plurality of read commands using a predefined read command sequence to a recipient storage volume, wherein the predefined read command sequence specifies one or more of a request size and an offset of at least two of the plurality of read commands, and wherein an entity associated with a recipient storage volume of at least one predefined storage volume type is configured to insert a predefined delay, responsive to the entity detecting that the plurality of read commands was sent using the predefined read command sequence, before sending a response to at least one of the plurality of read commands;

evaluating whether the response to at least one of the plurality of read commands comprises the predefined delay; and determining whether the recipient storage volume is at least one of the at least one predefined storage volume type based on a result of the evaluating.

15. The non-transitory processor-readable storage medium of claim 14, wherein the entity comprises one or more of a data server that serves a storage volume and a storage data client that exposes at least one virtual storage volume.

16. The non-transitory processor-readable storage medium of claim 14, further comprising initiating at least one predefined action based at least in part on the determined at least one predefined storage volume type.

17. The non-transitory processor-readable storage medium of claim 16, wherein the at least one predefined action comprises sending at least one notification of a configuration error.

18. The non-transitory processor-readable storage medium of claim 14, further comprising repeating the predefined read command sequence at least one additional time.

19. The non-transitory processor-readable storage medium of claim 14, wherein the at least one predefined storage volume type comprises one or more of: (i) at least one virtual storage volume exposed by a storage data client of a host device due to a configuration error, and (ii) at least one storage volume of a given version.

20. The non-transitory processor-readable storage medium of claim 14, wherein the predefined delay comprises one or more of: a specified delay duration and at least a specified minimum delay.

\* \* \* \* \*